United States Patent [19]
Cooke et al.

[11] 3,876,665
[45] Apr. 8, 1975

[54] 2-(N-CARBAMOYL-N-SUBSTITUTEDAMINO)-3,4-METHYLENEDIOXY BENZHYDROLS

[75] Inventors: George A. Cooke, Denville; William J. Houlihan, Mountain Lakes, both of N.J.

[73] Assignee: Sandoz-Wander, Inc., Hanover, N.J.

[22] Filed: Apr. 13, 1973

[21] Appl. No.: 351,092

Related U.S. Application Data

[62] Division of Ser. No. 140,990, May 6, 1971, Pat. No. 3,748,342.

[52] U.S. Cl.... 260/340.5; 260/251 Q; 260/251 QB; 260/319.1; 260/329 AM; 424/251
[51] Int. Cl............................................. C07d 13/10
[58] Field of Search ................. 260/340.5, 329 AM

[56] References Cited
UNITED STATES PATENTS

| 3,466,284 | 9/1969 | Sherlock | 260/251 |
| 3,509,145 | 4/1970 | Field et al. | 260/251 |

*Primary Examiner*—Donald G. Daus
*Assistant Examiner*—James H. Turnipseed
*Attorney, Agent, or Firm*—Gerald D. Sharkin; Richard E. Vila

[57] ABSTRACT

Processes are provided for preparing 1,4-disubstituted-methylenedioxy-2(1H)-quinazolinones which are useful as pharmaceutical agents, e.g., anti-inflammatory agents.

2 Claims, No Drawings

2-(N-CARBAMOYL-N-SUBSTITUTEDAMINO)-3,4-METHYLENEDIOXY BENZHYDROLS

This is a division of application Ser. No. 140,990, filed May 6, 1971, now U.S. Pat. No. 3,748,342.

This invention relates to 2(1H)-uinazolinone derivatives. More particularly, this invention provides processes and intermediates for preparing compounds of formula I:

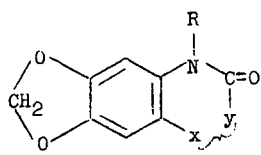

in which
R signifies an alkyl radical of 1 to 5 carbon atoms, e.g., methyl, ethyl, isopropyl and t-butyl; cyclo(lower)alkyl of 3 to 6 carbon atoms, e.g., cyclopropyl and cyclohexyl; or cyclo(lower)alkyl(lower) straight chain alkyl of 4 to 7 total carbon atoms in which athe cycloalkyl is of 3 to 6 carbon atoms and the straight chain alkyl is of 1 to 3 carbon atoms, e.g., cyclopropylmethyl; and
xy signifies a group

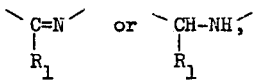

in which
$R_1$ signifies a radical of formula II:

or of formula III:

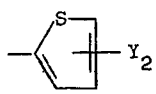

in which either Y and $Y_1$ are the same or different and signify a hydrogen, fluorine or chlorine atom, an alkyl or alkoxy radical of 1 to 3 carbon atoms, or a nitro or trifluoromethyl group, provided that no more than one of Y and $Y_1$ signifies a trifluoromethyl or nitro group;
or Y and $Y_1$ are on adjacent carbon atoms and together signify a methylenedioxy group, and
$Y_2$ signifies a hydrogen, fluorine or chlorine atom, or an alkyl radical of 1 to 3 carbon atoms.

The processes of this invention are characterised by
a. producing a compound of formula Ia,

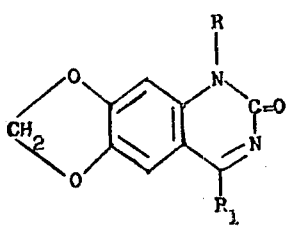

in which R and $R_1$ are as defined above,
by cyclising a compound of formula IV,

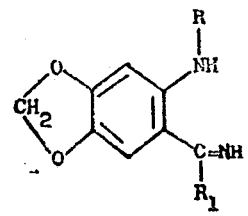

in which R and $R_1$ are as defined above, with phosgene, or
b. producing a compound of formula Ib,

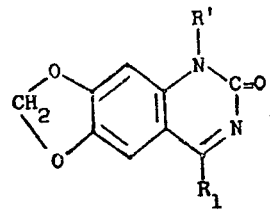

in which
$R_1$ is as defined above, and
R' has the same significance as R, defined above, except that it may not signify a tertiary alkyl group in which the tertiary carbon atom is directly attached to the ring nitrogen atom,
by cyclising a compound of formula IVa,

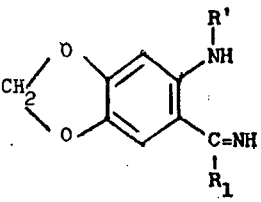

in which R' and $R_1$ are as defined above,
with a carbonic acid derivative selected from the group consisting of
i. a $C_{1-2}$ alkyl chlorocarbonate,
ii. a $C_{1-5}$ alkyl carbamate, and
iii. 1,1'-carbonyldiimidazole,
provided that when a $C_{1-5}$alkyl carbamate is employed, the reaction is effected at a temperature of at least 140°C, or
c. producing a compound of formula Ib, stated above, by cyclising a compound of formula Va.

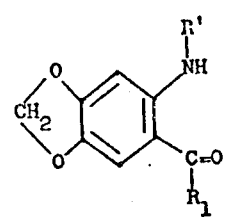

in which R' and R₁ are as defined above,
with a carbamic acid derivative selected from the group consisting of
 i. a $C_{1-5}$ alkyl carbamate,
 ii. urea, and
 iii. carbamyl chloride,
at an elevated temperature, provided that when a $C_{1-5}$ alkyl carbamate is employed, the process is effected at a temperature of at least 140°C. and in the presence of a catalytic amount of a Lewis acid, or d. producing a compound of formula Ia, stated above, by cyclising a compound of formula V,

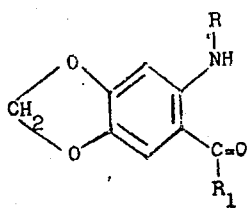
V in which R and R₁ are as defined above,
either i. by reaction with an acid chloride or bromide and an isocyanate of formula VI,

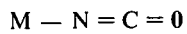
$$M — N = C = O$$
VI in which M signifies an alkali metal or alkaline earth metal cation, or the ammonium cation,
or with the reaction product of an acid chloride or bromide and an isocyanate of formula VI, stated above, and (ii) with isocyanic acid, or e. producing a compound of formula Ic

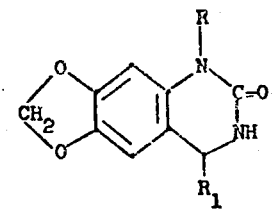
Ic in which R and R₁ are as defined above,
by cyclising a compound of formula VII,

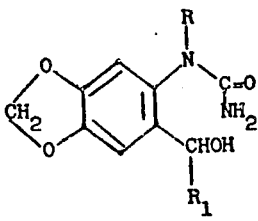
VII in which R and R₁ are as defined above,
by removal of the elements of water.

Process (a) is suitably carried out at a temperature of from 0°C. to 50°C., preferably 10°C. to 30°C. The reaction may be carried out in an organic solvent which is inert under the reaction conditions, suitably an aromatic hydrocarbon, e.g. benzene, toluene, and xylene, preferably benzene. The mole ratio of phosgene to the compound of formula IV is not particularly critical but a substantial excess of phosgene is preferably employed. The process may optionally be carried out in the presence of an acid-binding agent such as an inorganic base, e.g. sodium or potassium carbonate, or a tertiary amine, e.g. a trialkylamine or pyridine, preferably triethylamine.

Process (b) (i) involving reaction of a compound of formula IVa with methyl chlorocarbonate or ethyl chlorocarbonate, preferably ethyl chlorocarbonate, may suitably be carried out at a temperature of from 30°C. to 150°C., preferably 60°C. to 100°C. The reaction may be carried out in an organic solvent which is inert under the reaction conditions, suitably an aromatic hydrocarbon, e.g. benzene, toluene, and xylene, preferably benzene. Other suitable solvents include dioxane. The mole ratio of the chlorocarbonate to the compound of formula IVa is not critical but the reaction is preferably carried out with a substantial excess of the chlorocarbonate. The reaction time may, for example, range from one-half hour to 10 hours, more usually 1 to 4 hours. The cyclisation with the chlorocarbonate may be optionally carried out in the presence of an acid-binding agent such as an inorganic base, e.g. sodium carbonate or potassium carbonate, or a tertiary amine, e.g. a trialkylamine or pyridine, more preferably triethylamine.

Process (b) (ii) is suitably carried out at a temperature of from 140° to 200°C, preferably 160° to 180°C. The mole ratio of the alkyl carbamate, preferably urethane, to the compound of formula Iva is not critical. In the preferred forms of practice, there is employed a substantial excess of carbamate which also serves as the preferred solvent for the reaction. Other suitable high-boiling organic solvents which are inert under the reaction conditions may alternatively or additionally be employed, if desired. The reaction time may for example range for one-half to 10 hours, more usually 1 to 4 hours. The cyclisation with the carbamate is optionally and preferably conducted in the presence of a Lewis acid as catalyst for the reaction. The amount of Lewis acid employed is preferably between about 5% to 20% based on the weight of compound IVa in the reaction mixture. The preferred catalyst is zinc chloride.

Process (b) (iii) is suitably carried out at a temperature of from 20°C to 120°C, preferably 60°C to 90°C. The reaction is preferably carried out in an organic solvent which is inert under the reaction conditions, suitably an aromatic hydrocarbon, e.g. benzene, toluene or xylene, especially benzene. The mole ratio of 1,1'-carbonyldiimidazole to the compound of formula IVa is not particularly critical but an excess of 1,1'-carbonyldiimidazole is preferably employed.

Process (c) (i) is conveniently carried out at a temperature of from 140°C to 200°C, the preferred Lewis acid being zinc chloride and the preferred carbamate being ethyl carbamate. If desired, the reaction may be carried out in an organic solvent which is inert under the reaction conditions, e.g. o-dichlorobenzene, but this is not necessary since an excess of the carbamate can be used for this purpose. Depending on the particular conditions employed, a suitable reaction time is from about 30 minutes to about 4 hours.

Process (c) (ii) is a reaction of known type and may, for example, be effected in manner analogous to that described in Japanese Patent No. 20865/65, published Sept. 16, 1965. The process is conveniently effected at a temperature of from 140° to 220°C, preferably 180° to 210°C, and in the absence of added solvent.

Process (c) (iii) may be effected in similar manner to process (c) (ii).

Process (d) (i) is conveniently effected in an organic solvent which is inert under the reaction conditions, at a temperature of from 10°C to 80°C, preferably 30°C to 70°C. As indicated, the process may be effected by reacting a compound of formula V with the reaction product of an acid chloride or bromide and an isocyanate of formula VI and it is generally preferred to first react the acid halide and compound of formula VI and then add the compound of formula V to the resulting reaction mixture. The reaction of the acid halide and compound VI is exothermic and is preferably initiated at a temperature of from 10°C to 30°C. It will be understood that the acid halides employed should not carry substituents or functional groups which would interfere with the process. Suitable acid halides include acetyl chloride and benzoyl chloride, preferably benzoyl chloride. Naturally, the most suitable compounds of formula VI are those most readily reacting with the acid halide to eliminate as a by-product a halide of the cation M. Suitably, the compound of formula VI is an alkali metal isocyanate such as sodium isocyanate or ammonium isocyanate, and preferably ammonium isocyanate. Suitable solvents include lower alcohols, ketones and cyclic ethers, acetone being preferred.

Process (d) (ii) is suitably effected at a temperature of from 50°C to 150°C, preferably 100°C to 140°C. Isocyanic acid is well known to be unstable and is therefore desirably prepared in situ Thus, the process may be effected in acidic medium employing a salt of isocyanic acid of formula VI stated above. The compound of formula VI is preferably an alkali metal, e.g. sodium or potassium salt or most preferably the ammonium salt. The acid employed to produce in situ the desired isocyanic acid from the compound of formula VI is preferably a lower carboxylic acid, desirably acetic acid, which may also be conveniently employed as a solvent for the reaction.

process (e) is preferably carried out at an elevated temperature and under acidic conditions. Suitable temperatures are for example from 80°C to 150°C, preferably 95°C to 120°C. The acid employed in the dehydration is desirably a strong inorganic acid such as sulfuric acid or hydrochloric acid, or an organic acid such as acetic acid, more preferably the latter. Water may be employed as the sole reaction medium although various co-solvents, e.g. ethanol, may also be used, if desired or required to insure optimum solubility.

Process (e) is a reaction of a type described in the literature, for example, J. Chem. Soc. 1959, 3555.

The resulting compounds of formula I may be isolated and purified using conventional techniques.

The compounds of formulae IV and IVa employed as starting materials in processes (a) and (b) may be produced by reacting a corresponding compound of formula V, stated above, with ammonia in a known manner. The reaction is desirably carried out in a sealed reactor under anhydrous conditions and at an elevated temperature and pressure. The reaction temperature is suitably from 100°C. to 200°C., preferably 110°C. to 150°C. A catalyst such as a Lewis acid, e.g. zinc chloride, may be employed to advantage in the process. The reaction is preferably carried out using an excess of ammonia as solvent, although a suitable co-solvent, e.g. dioxane, may also be employed.

The compounds of the formula IV having the formula IVb,

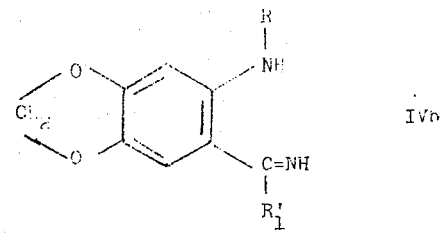

in which R and $R_1'$ are as defined above, may also be produced by reacting a compound of formula VIII

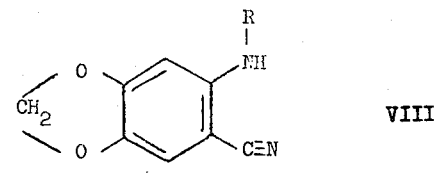

in which R is as defined above, with a compound of formula IX, i.e., $R_1'Q$ wherein $R_1'$ is the same as $R_1$ excluding nitro substituted phenyl and Q is lithium or —MgX'' wherein X'' is chloro or bromo, and hydrolyzing the resulting product in manner known per se.

The reaction of the compound of formula VIII with the compound IX is preferably effected at room temperature in an inert organic solvent, e.g. diethyl ether. The compound of formula IX is preferably a lithium compound. The resulting reaction mixture is suitably subjected directly to hydrolysis in manner known per se. The hydrolysis may suitably be effected for example by simply pouring the mixture over ice.

The compounds of formula V and Va employed as starting materials in processes (c) and (d), and in producing compounds IV and IVa, as described above, are either known, or may be produced in conventional manner from available materials.

The compounds of formula VII, employed as starting materials in process (e), may be produced by reacting a compound of formula X,

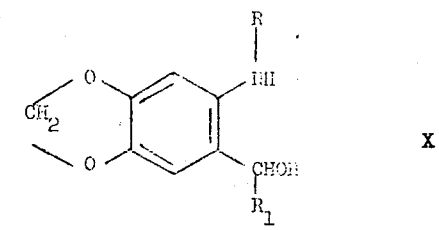

in which R and $R_1$ are as defined above, with isocyanic acid.

The reaction is desirably carried out in acidic aqueous medium at a controlled temperature of from 0°C. to about 80°C., preferably from 15°C. to 35°C. The isocyanic acid is preferably formed in situ by effecting the reaction in acidic medium and employing a salt of isocyanic acid of formula VI, stated above. The compound of formula VI is suitably an alkali metal, e.g. sodium or potassium, an alkaline earth metal, e.g. calcium, or ammonium isocyanate and is preferably potassium isocyanate. The acid employed to provide the acidic reaction medium and produce in situ the desired isocyanic acid from the salt of formula VI is preferably a strong inorganic acid, for example, sulfuric acid or hydrochloride acid, or an organic acid such as acetic acid, more preferably the latter.

The compounds of formula VIII, used for producing compounds of formula IVb as described above, may be produced in manner known per se by tosylation, alkylation and detosylation of a compound of formula XXVII,

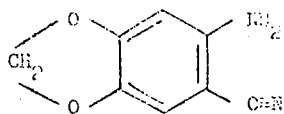

XI

Compounds of formula VIIIa

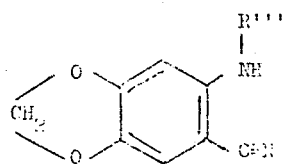

VIIIa in which R''' signifies cycloalkyl or a branched alkyl radical of 3 to 5 carbon atoms, in which the branching occurs on the carbon atom adjacent to the nitrogen atom,
are, however, preferably produced by reacting a compound of formula XXVII, stated above, with a compound of formula XII,

XII in which R''' is as defined above, and X'' is bromo or iodo, preferably iodo.

The reaction is desirably carried out in the presence of a base, preferably an inorganic base, such as an alkali metal carbonate, to take up the hydrogen halide liberated during the reaction. The reaction may be effected in an organic solvent which is inert under the reaction conditions, e.g. dioxane, benzene and toluene. However, the use of a solvent is not necessary and a substantial excess of the compound of formula XII is preferably employed to provide the solvent medium. The reaction is suitably carried out at an elevated temperature which is not especially critical but preferably lies in the range of from 60°C. to 140°C., more preferably 70°C. to 110°C.

The compound of formula XI is known.

The compounds of formula X used for producing compounds of formula VII, as described above, may be produced in manner know per se, e.g. by reduction of a compound of formula V, stated above, for example with sodium borohydride, in an organic solvent which is inert under the reaction conditions, as described by G. N. Walker, J. Org. Chem. 27, 1929 (1962).

Unless otherwise indicated, the products of the various intermediary processes described herein, may be isolated and purified using conventional techniques.

The compounds of formula I are useful because they possess pharmaceutical activity in animals. In particular, the compounds are useful as anti-inflammatory agents as indicated by the Carrageenan-induced edema test in rats. For such use, the compounds may be combined with a pharmaceutically acceptable carrier, and such other conventional adjuvants as may be desired, and preferably administered orally in such forms as tablets, capsules, elixirs, suspensions and the like. For the above-mentioned use, the dosage administered will, of course, vary depending upon known factors such as the particular compound used and mode of administration. However, in general, the compounds of formula Ia provide satisfactory results when administered at a daily dose of from about 0.15 milligrams to 180 milligrams per kilogram of body weight, preferably given in divided doses 2 to 4 times a day, with daily dosage for large mammals ranging from between about 10 milligrams to 1000 milligrams and individual doses between 3 milligrams to 500 milligrams. The compounds of formula Ic in general provide satisfactory results when administered at a daily dose of from about 2 milligrams to 200 milligrams per kilogram of body weight, preferably given in divided doses, with daily dose for large mammals ranging between about 140 milligrams to 2000 milligrams and individual doses ranging between 35 to 1000 milligrams.

The compounds of the formula I, particularly Ia, are also useful as analgesics, as indicated by application of pressure to yeast-inflamed foot of the rat (oral administration), and as anti-pyretics as indicated by inhibition of yeast-induced fever in rats (oral administration). For such uses, the compounds may be administered in modes and forms similar to those employed in the treatment of inflammation and at dosages indicated above as applicable for the use of the compound in the treatment of inflammation. The compounds may be administered orally in such forms as tablets, dispersable powders, granules, capsules, elixirs, suspensions and syrups, or parenterally in the form of an injectable solution or suspension. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional exipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin.

The preferred pharmaceutical compositions from the standpoint of preparation and ease of administration are solid compositions, particularly hard-filled capsules and tablets.

A representative formulation is a capsule prepared by conventional techniques and containing the following ingredients:

| Ingredient | Parts by Weight |
|---|---|
| Compound of formula I, e.g. 1-isopropyl-4-phenyl-6,7-methylene-dioxy-2(1H)-quinazolinone | 50 |
| Inert solid diluent e.g. Kaolin | 200 |

Preferred compounds of formula I from the point of view of pharmacological activity, are the compounds of formula Ia, particularly those in which R signifies an isopropyl radical, for example, 1-isopropyl-4-phenyl-6,7-methylenedioxy-2(1H-quinazolinone and 1-isopropyl-4-(p-fluorophenyl)-6,7-methylenedioxy-2(1H)-quinazolinone.

EXAMPLE A

Preparation of 2-isopropylamino-4,5-methylenedioxy benzophenone

Step 1

To a flask equipped with a stirrer and Dean-Stark water separator are charged 53 g. of benzoin, 51g. of 3,4-methylenedioxyaniline, 2.5 g. of p-toluenesulfonic acid and 300 ml. of xylene. The mixture is stirred and refluxed for 10 hours. After cooling to room temperature 1500 ml. of chloroform are added and the organic layer is washed two times with 150 ml. of 10%, sulfuic acid. The organic layer is treated with charcoal, filtered and concentrated in vacuo to ca. 500 ml. On standing there is obtained 2,3-diphenyl-5,6-methylenedioxyindole, m.p. 187–188°C.

Step 2

To a flask equipped with a stirrer, condenser, dropping funnel and thermometer are charged 31.3 g. of 2,-3-diphenyl-5,6-methylenedioxy indole, 600 ml. of acetic acid and 0.30 g. of ammonium molybdate dissolved in 30 ml. of water. The stirred mixture is heated to 60°–65°C. and then treated dropwise (about 15 minutes) with 30 ml. of 40% hydrogen peroxide. The mixture is maintained at 65° for about 2 hours and then treated with 150 ml. water. The resultant solid is filtered off and recrystallized from chloroform to give 2-benzoylamino-4,5-methylenedioxybenzophenone, m.p. 195°–197°C.

Step 3

To a flask equipped with a stirrer and condenser are charged 40 g. of 2-benzoylamino-4,5-methylenedioxybenzophenone, 150 ml. of ethanol and 100 ml. of 50% sodium hydroxide. The mixture is stirred and refluxed for 2 hours. The solution is treated with 400 ml. of water and the resulting solid is filtered off to give 2-amino-4,5-methylenedioxybenzophenone m.p. 160°–161°C.

Step 4

To a flask equipped with a stirrer and condenser are charged 80 g. of 2-amino-4,5-methylenedioxybenzophenone, 600 ml. of isopropyliodide and 80 g. anhydrous potassium carbonate. The mixture is stirred and refluxed for ca. 48 hours, cooled to room temperature, filtered and concentrated in vacuo on a rotary evaporator. The residue is dissolved in 1:L chloroform-hexane and chromatographed through a silica gel (500 g.) column with the same solvent system. There is obtained 2-isopropylamino-4,5-methylenedioxybenzophenone, which, when recrystallized from ethanol, has a melting point of 77°–78°C.

EXAMPLE 1

Process C) (i)

Preparation of 1-isopropyl-4-phenyl-6,7-methylenedioxy-2(1H)quinazolinone

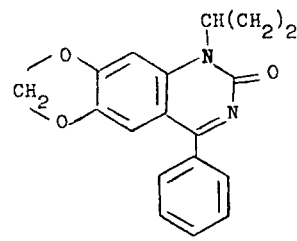

To a flask equipped with a stirrer and a condenser-distillation head arranged for atomspheric distillation are charged 28 g. of 2-isopropylamino-4,5-methylenedioxybenzophenone (prepared as in Example A),50 g. of ethyl carbamate and 4.5 g. of anhydrous zinc chloride. The mixture is stirred and heated at 160°–165°C. for 45 minutes; 175°–180°C. for 45 minutes and 185°–190°C. for 1.0 hour. During this period a distillate of ethanol and ethyl carbamate is obtained. The cooled residue is treated with ca. 250 ml. chloroform and 25 g. of charcoal. The mixture is filtered and the filtrate concentrated in vacuo. The residue is dissolved in 1:1 chloroform-hexane and chromatographed through a silica gel (150 g.) column with the same solvent system. There is obtained 1-isopropyl-4-phenyl-6,7-methylenedioxy-2(1H)-quinazolinone, m.p. 194°–194.5°C.

EXAMPLE B

Preparation of 2-(N-carbamoylisopropylamino)-4,5-methylenedioxybenzhydrol)

Step 1

To a flask equipped with a stirrer and condenser are charged 5.09 g. of 2-isopropylamino-4,5-methylenedioxybenzophenone (prepared in Example A) and 125 ml. of methanol. The stirred solution is treated portionwise (ca. 15 minutes) with 2.5 g. of sodium borohydride. The resulting mixture is stirred at room temperature for ca. 12 hours and then concentrated in vacuo. The residue is treated with 100 ml. of water and then extracted with two 50 ml. portions of $CH_2Cl_2$. The organic layer is dried with anhydrous $Na_2SO_4$, filtered and concentrated. Upon recrystallization from ether, there is obtained 2-isopropylamino-4,5-methylenedioxybenzohydrol, which melts at 78°–80°C.

Step 2

To a flask equipped with stirrer are charged 1.5 g. of 2-isopropylamino-4,5-methylenedioxybenzhydrol and 7.5 ml. of 2N HCl. The solution is stirred and treated in one portion with 0.78 g. of sodium cyanate in 15 ml. of water. After stirring for ca. 18 hours at room temperature the reaction mixture is filtered and the obtained solids recrystallized from ether to give 2-(N-carbamoylisopropylamino)-4,5-methylenedioxybenzhydrol, m.p. 145°–150°C. (ether).

Following substantially the procedure of the foregoing examples the following compounds of the invention are prepared:

A-1. 1-isopropyl-4-(m-fluorophenyl)-6,7-methylenedioxy-3,4-dihydro-2(1H)-quinazolinone, m.p. 165°–167°C.

A-2. 1-isopropyl-4-(m-fluorophenyl)-6,7-methylenedioxy-2(1H)-quinazolinone, m.p. 169°–170°C.

B-1. 1-isopropyl-4-(m-methoxyphenyl)-6,7-methylenedioxy-3,4-dihydro-2(1H)-quinazolinone, m.p. 167°–168°C.

B-2. 1-isopropyl-4-(m-methoxyphenyl)-6,7-methylenedioxy-2(1H)-quinazolinone, m.p. 189°–191°C.

C-1. 1-isopropyl-4-(p-methylphenyl)-6,7-methylenedioxy-3,4-dihydro-2(1H)-quinazolinone, m.p. 192°–194°C.

C-2. 1-isopropyl-4-(p-methylphenyl)-6,7-methylenedioxy-2(1H)-quinazolinone, m.p. 188°–190°C.

D-1. 1-isopropyl-4-(o-nitrophenyl-6,7-methylenedioxy-3,4-dihydro-2(1H)-quinazolinone, m.p. 202°–205°C.

D-2. 1-isopropyl-4-(o-nitrophenyl)-6,7-methylenedioxy-2(1H)-quinazolinone, m.p. 148°–150°C.

E-1. 1-isopropyl-4-(5'-chloro-2-thienyl)-6,7-methylenedioxy-3,4-dihydro-2(1H)-quinazolinone, m.p. 162°–164°C.

E-2. 1-isopropyl-4-(5'-chloro-2-thienyl)-6,7-methylenedioxy-2(1H)quinazolinone, m.p. 192°–201°C.

F-1. 1-isopropyl-4-(3,4-methylenedioxyphenyl)-6,7-methylenedioxy-3,4-dihydro-2(1H)-quinazolinone, m.p. 145°–147°C.

F-2. 1-isopropyl-4-(3,4-methylenedioxyphenyl)-6,7-methylenedioxy-2(1H)-quinazolinone, m.p. 234°–235°C.

G-1. 1-isopropyl-4-(m-nitrophenyl)-6,7-methylenedioxy-3,4-dihydro-2(1H)-quinazolinone, m.p. 218°–220°C.

G-2. 1-isopropyl-4-(m-nitrophenyl)-6,7-methylenedioxy-2(1H)-quinazolinone, m.p. 230°–232°;

H-1. 1-isopropyl-4-(o-methylphenyl)-6,7-methylenedioxy-3,4-dihydro-2(1H)-quinazolinone, m.p. 172°–174°;

H-2. 1-isopropyl-4-(o-methylphenyl)-6,7-methylenedioxy-2(1H)-quinazolinone, m.p. 155°–157°;

I-1. 1-isopropyl-4-(p-fluorophenyl)-6,7-methylenedioxy-3,4-dihydro-2(1H)-quinazolinone, m.p. 163°–166°;

I-2. 1-isopropyl-4-(p-fluorophenyl-6,7-methylenedioxy-2(1H)-quinazolinone, m.p. 238°–240°;

J-1. 1-isopropyl-4-(3,4-dichlorophenyl)-6,7-methylenedioxy-3,4-dihydro-2(1H)-quinazolinone, m.p. 155°–157°;

J-2. 1-isopropyl-4-(3,4-dichlorophenyl)-6,7-methylenedioxy-2(1H)-quinazolinone, m.p. 239°–242°;

K-1. 1-methyl-4-phenyl-6,7-methylenedioxy-3,4-dihydro-2(1H)-quinazolinone, m.p. 231°–232°;

K-2. 1-methyl-4-phenyl-6,7-methylenedioxy-2(1H)-quinazolinone, m.p. 257°–260°;

L-1. 1-cyclopropylmethyl-4-phenyl-6,7-methylenedioxy-3,4-dihydro-2(1H)-quinazolinone.

L-2. 1-cyclopropylmethyl-4-phenyl-6,7-methylenedioxy-2(1H)-quinazolinone.

What is claimed is:

1. A compound of the formula:

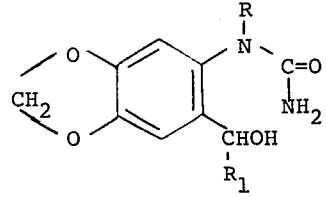

wherein

R is alkyl of 1 to 5 carbon atoms, cyclo(lower)alkyl 31 of 3 to 6 carbon atoms, or cyclo (lower)alkyl(-lower) straight chain alkyl of 4 to 7 total carbon atoms in which the cycloalkyl is of 3 to 6 carbon atoms and the straight chain alkyl is of 1 to 3 carbon atoms, $R_1$ signifies a group of formula

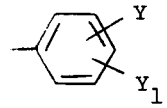

or of formula

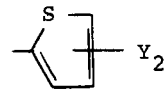

in which either Y and $Y_1$ are the same or different and signify a hydrogen, fluorine or chlorine atom, alkyl of 1 to 3 carbon atoms or alkoxy of 1 to 3 carbon atoms, or a nitro or trifluoromethyl group, provided that no more than one of Y and $Y_1$ signifies a trifluoromethyl or nitro group;

or Y and $Y_1$ are on adjacent carbon atoms and together signify methylenedioxy, and $Y_2$ signifies a hydrogen, fluorine or chlorine atom, or alkyl of 1 to 3 carbon atoms.

2. The compound of claim 1 in which R is isopropyl and $R_1$ is phenyl.

* * * * *